(12) United States Patent
S et al.

(10) Patent No.: US 10,911,296 B2
(45) Date of Patent: Feb. 2, 2021

(54) TARGETED SELECTION OF CASCADE PORTS

(71) Applicant: Juniper Networks, Inc., Sunnyvale, CA (US)

(72) Inventors: Vishnu Janardhanan S, Bangalore (IN); Babu Singarayan, San Jose, CA (US); Puneet Kedia, Bangalore (IN); Pratibha Goel, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 12 days.

(21) Appl. No.: 15/933,902

(22) Filed: Mar. 23, 2018

(65) Prior Publication Data

US 2019/0296965 A1 Sep. 26, 2019

(51) Int. Cl.
*G06F 15/173* (2006.01)
*H04L 12/24* (2006.01)
(Continued)

(52) U.S. Cl.
CPC ...... *H04L 41/0668* (2013.01); *H04L 12/4625* (2013.01); *H04L 47/125* (2013.01);
(Continued)

(58) Field of Classification Search
CPC ............. H04L 12/4625; H04L 41/0668; H04L 45/507; H04L 45/7453; H04L 47/125;
(Continued)

(56) References Cited

U.S. PATENT DOCUMENTS 8,230,110 B2 7/2012 Vegesna et al.
8,526,427 B1 9/2013 Smith et al.
(Continued)

FOREIGN PATENT DOCUMENTS

CN 1871822 A 11/2006
CN 102546742 A 7/2012
CN 105991445 A 10/2016

OTHER PUBLICATIONS

Extended European Search Report from counterpart European Application No. 19163264.5, dated Jun. 17, 2019, 9 pp.
Juniper Networks, Inc."Understanding Junos Fusion Ports," Juniper Networks Tech Library, Aug. 20, 2018, 5 pp.
Juniper Networks, Inc. "Juno Fusion Data Center Overview" Junos Fusion Data Center Feature Guide available at https://www.juniper.net/documentation/en_US/junos/topics/concept/junos-fusion-data-center-overview.html (accessed Mar. 22, 2018), modified Nov. 30, 2017, 2 pp.

(Continued)

*Primary Examiner* — Ryan J Jakovac
(74) *Attorney, Agent, or Firm* — Shumaker & Sieffert, P.A.

(57) ABSTRACT

Techniques are described for providing targeted selection of cascade ports of an aggregation device. In one example, the disclosed techniques enable dynamic assignment of active and backup cascade ports of an aggregation device for each extended port of satellite devices. In this example, rather than allocating resources for each of the extended ports of the satellite devices on all of the cascade ports of the aggregation device, the aggregation device instead allocates resources for each of the extended port only on the assigned active and backup cascade ports for the respective one of the extended ports of the satellite devices. The techniques are also described for providing traffic steering to a backup cascade port in the event the assigned active cascade port is unreachable, and, if the cascade port remains unreachable for a specified duration, the aggregation device may assign new active and backup cascade ports for the extended port.

14 Claims, 7 Drawing Sheets

(51) Int. Cl.
| | |
|---|---|
| *H04L 12/911* | (2013.01) |
| *H04L 12/947* | (2013.01) |
| *H04L 12/46* | (2006.01) |
| *H04L 12/933* | (2013.01) |
| *H04L 12/803* | (2013.01) |
| *H04L 12/743* | (2013.01) |
| *H04L 12/863* | (2013.01) |
| *H04L 12/723* | (2013.01) |

(52) U.S. Cl.
CPC .............. *H04L 47/70* (2013.01); *H04L 49/15* (2013.01); *H04L 49/25* (2013.01); *H04L 45/507* (2013.01); *H04L 45/7453* (2013.01); *H04L 47/6215* (2013.01)

(58) Field of Classification Search
CPC ..... H04L 47/6215; H04L 47/70; H04L 49/15; H04L 49/25
See application file for complete search history.

(56) References Cited

U.S. PATENT DOCUMENTS

| | | | |
|---|---|---|---|
| 8,560,660 B2 | 10/2013 | Kalusivalingam et al. | |
| 8,797,844 B1 | 8/2014 | Strahle et al. | |
| 10,554,494 B1 | 2/2020 | Thakor et al. | |
| 2006/0171302 A1* | 8/2006 | Tallet | H04L 45/48 370/225 |
| 2014/0269710 A1* | 9/2014 | Sundaram | H04L 45/302 370/392 |
| 2014/0310391 A1* | 10/2014 | Sorenson, III | H04L 45/24 709/223 |
| 2015/0370668 A1* | 12/2015 | Nazari | H04L 41/0668 714/6.3 |
| 2016/0359805 A1 | 12/2016 | Spraggs et al. | |
| 2018/0198634 A1* | 7/2018 | Lentczner | H04L 45/66 |

OTHER PUBLICATIONS

Juniper Networks, Inc. "Simplify the Data Center with Junos Fusion" Juniper Networks Fabric Technology, White Paper, 2015 (Applicant points out, in accordance with MPEP 609.04(a), that the year of publication, 2015, is sufficiently earlier than the effective U.S. filing date Mar. 23, 2018, so that the particular month of publication is not in issue.) 7 pp.

Juniper Networks, Inc. "Understanding Junos Fusion Data Center Components" Junos Fusion Data Center Feature Guide available at https://www.juniper.net/documentation/en_US/junos/topics/concept/fusion-data-center-components.html (accessed Mar. 22, 2018), modified Dec. 6, 2017, 5 pp.

U.S. Appl. No. 15/819,265, by Juniper Networks, Inc. (Inventor: Craig Frink), filed Nov. 21, 2017.

Anilak, "How to bring up Junos Fusion Enterprise Dual Aggregated System," https://forums.juniper.net/t5/tkb/articleprintpage/tkbid/Switching_TKB/articleid/25, J-Net Community, Aug. 23, 2016, 9 pp.

IEEE Std 802.1BR™-2012, "IEEE Standard for Local and metropolitan area networks—Virtual Bridged Local Area Networks—Bridge Port Extension," IEEE Computer Society, Jul. 16, 2012, 135 pp.

"Junos Fusion Provider Edge Overview," Tech Library—Juniper Networks, Mar. 26, 2019, Retrieved from: https://www.juniper.netldocumentation/en_US/junos/topics/concept/fusion-provider-edge-overview.html, accessed Dec. 19, 2019, 4 pp.

Response to Extended Search Report dated Jun. 17, 2019, from counterpart European Application No. 19163264.5, filed Mar. 23, 2020 , 15 pp.

Office Action with Search Report and Translation thereof dated Nov. 19, 2020 received in counterpart CN Application No. 2019101878035 12 pp.

* cited by examiner

| SELECTOR INDEX 402 | 0 | 1 | 2 | 3 | 4 | 5 | 6 | 7 | 8 | 9 | 10 | 11 |
|---|---|---|---|---|---|---|---|---|---|---|---|---|
| ASSOCIATION 404 | 0,1 | 0,2 | 0,3 | 1,0 | 1,2 | 1,3 | 2,0 | 2,1 | 2,3 | 3,0 | 3,1 | 3,2 |
| VALUE AT SELECTOR INDEX 406 | 0 | 0 | 0 | 1 | 1 | 1 | 2 | 2 | 2 | 3 | 3 | 3 |
| VALUE IF CP 36B GOES DOWN 408 | 0 | 0 | 0 | 0 | 2 | 3 | 2 | 2 | 2 | 3 | 3 | 3 |

SELECTOR DATA STRUCTURE 400

CASCADE PORT 36A = 0
CASCADE PORT 36B = 1
CASCADE PORT 36C = 2
CASCADE PORT 36D = 3

FIG. 4A

| SELECTOR DATA STRUCTURE 400 | | | | | | | | | | | | |
|---|---|---|---|---|---|---|---|---|---|---|---|---|
| SELECTOR INDEX 402 | 0 | 1 | 2 | 3 | 4 | 5 | 6 | 7 | 8 | 9 | 10 | 11 |
| ASSOCIATION 404 | 0,2 | 0,2 | 0,3 | 0,3 | 2,0 | 3,2 | 2,0 | 2,3 | 2,3 | 3,0 | 3,0 | 3,2 |
| VALUE AT SELECTOR INDEX 406 | 0 | 0 | 0 | 0 | 2 | 3 | 2 | 2 | 2 | 3 | 3 | 3 |
| VALUE IF CP 36B GOES DOWN 408 | 0 | 0 | 0 | 0 | 2 | 3 | 2 | 2 | 2 | 3 | 3 | 3 |

CASCADE PORT 36A = 0
CASCADE PORT 36B = 1
CASCADE PORT 36C = 2
CASCADE PORT 36D = 3

TARGETED SELECTION OF CASCADE PORTS

TECHNICAL FIELD

The invention relates to computer networks.

BACKGROUND

A computer network is a collection of interconnected computing devices that exchange data and share resources. In certain types of computer networks, such as enterprise networks, data center networks, and service provider access networks, administrators need to configure and manage large numbers of endpoint users or customers attempting to send and receive data through the network.

As one example, an enterprise network connects a plurality of remote enterprise sites that belong to a single enterprise, such as a university, corporation, business, or other large entity. Each of the enterprise sites may comprise a private network, such a local area network (LAN) or wide area network (WAN) that includes a plurality of customer devices, such as desktop computers, laptops, workstations, personal digital assistants (PDAs), Internet of Things (IOT) devices, wireless devices, network-ready appliances, file servers, print servers or other devices.

An enterprise network may include an enterprise switch that manages connectivity between hosts or endpoints within the enterprise network. The enterprise switch may include a plurality of network devices, e.g., routers and/or switches, that provide hosts with access to the enterprise network, and to provide hosts with connectivity for host-to-host traffic within and between the enterprise sites.

SUMMARY

In general, the disclosure describes techniques for providing targeted selection of cascade ports of a network device for forwarding packets through an enterprise or data center network. The network device, also referred to as an aggregation device, is connected to one or more client devices, also referred to as access devices or satellite devices, in a two-tier structure to form a switch fabric. The aggregation device centrally manages interface configuration for each satellite device interface. For example, the aggregation device includes cascade ports for sending and receiving control and network traffic from satellite devices. The satellite devices each includes one or more host-facing ports, also referred to as extended ports, that transmit and receive network traffic from the hosts, and are associated with the cascade ports of the aggregation device.

The disclosed techniques enable dynamic assignment of active and backup cascade ports of an aggregation device for each extended port of the satellite devices. Rather than allocating resources for each of the extended ports of the satellite devices on all of the cascade ports of the aggregation device, the aggregation device instead allocates resources for each of the extended ports only on the assigned active and backup cascade ports for the respective one of the extended ports of the satellite devices.

The disclosed techniques also provide for steering traffic to a backup cascade port in the event an active cascade port is temporarily unreachable, and steering traffic back to the active cascade port when the active cascade port again becomes reachable. In some examples, if the cascade port is permanently unreachable or unreachable for a specified duration, the aggregation device may assign new active and backup cascade ports for the extended ports of the satellite devices to which the unreachable cascade port was previously assigned.

In this way, the techniques provide various technical improvements, such as reduced resource utilization for extended port and cascade port combinations, and protects from cascade port failures with no packet churning or packet loss.

In one example, a method includes assigning, by an aggregation device that manages interface configuration of a satellite device coupled to the aggregation device by a plurality of cascade ports, an active cascade port and a backup cascade port from the plurality of cascade ports for each extended port of a plurality of extended ports of the satellite device. The method also includes allocating, by the aggregation device, one or more resources of the aggregation device only for the assigned active cascade port and the assigned backup cascade port for each extended port of the plurality of extended ports of the satellite device.

In another example, an aggregation device includes a memory and one or more processors in communication with the memory configured to: manage interface configuration for a satellite device coupled to the aggregation device; assign an active cascade port and a backup cascade port from a plurality of cascade ports for each extended port of a plurality of extended ports of the satellite device; and allocate one or more resources of the aggregation device only for the assigned active cascade port and the assigned backup cascade port for each extended port of the plurality of extended ports of the satellite device.

In another example, a non-transitory computer-readable storage medium storing instructions that when executed cause one or more programmable processors of an aggregation device to: manage interface configuration for a satellite device coupled to the aggregation device; assign an active cascade port and a backup cascade port from a plurality of cascade ports for each extended port of a plurality of extended ports of the satellite device; and allocate one or more resources of the aggregation device only for the assigned active cascade port and the assigned backup cascade port for each extended port of the plurality of extended ports of the satellite device.

The details of one or more examples of this disclosure are set forth in the accompanying drawings and the description below. Other features, objects, and advantages of the disclosure will be apparent from the description and drawings, and from the claims.

DETAILED DESCRIPTION

Figure 1:
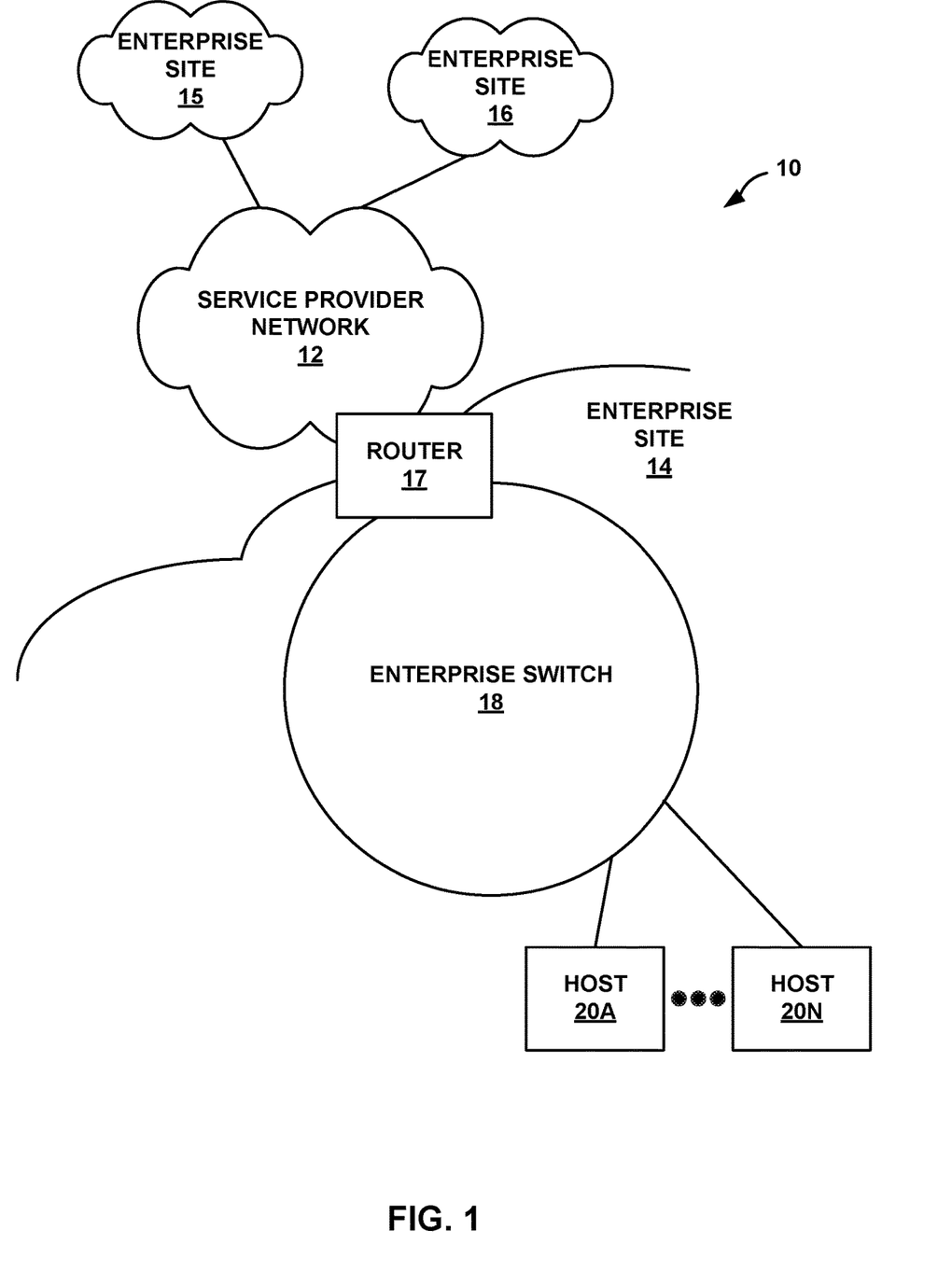
FIG. 1 is a block diagram illustrating an example enterprise network with an enterprise switch configured to operate in accordance with the techniques described in this disclosure.

FIG. 1 is a block diagram illustrating an example enterprise network 10 with an enterprise site 14 having an enterprise switch 18 configured to operate in accordance with the techniques described in this disclosure. Enterprise switch 18 manages connectivity between hosts or endpoints within enterprise network 10, including local hosts 20A-20N (collectively "hosts 20") within enterprise site 14 as well as hosts included in enterprise sites 15 and 16.

Enterprise sites 14, 15, and 16 may be geographically separated enterprise sites that belong to a single enterprise, such as a university, corporation, business, or other large entity. Each of the enterprise sites 14, 15, and 16 may comprise a private network, such a local area network (LAN) or wide area network (WAN) that includes a plurality of hosts, e.g., hosts 20 within enterprise site 14. As an example, hosts 20 may include data servers, switches, or customer devices, such as desktop computers, laptops, workstations, personal digital assistance (PDAs), Internet of Things (IOT) devices, wireless devices, network-ready appliances, file servers, print servers or other devices.

One or more hosts (not shown) within enterprise sites 15 and 16 may be logically connected to one or more of hosts 20 within enterprise site 14 across service provider network 12. The hosts within each of the enterprise sites 14, 15, and 16 may each be included in one or more virtual LANs (VLANs), which are groups of devices on one or more LANs that are configured to communicate as if they are attached to the same wire. Enterprise switch 18 may be configured to provide hosts 20 with access to service provider network 12 via router 17, and to provide hosts 20 with connectivity for host-to-host traffic within enterprise site 14. Service provider network 12, in turn, provides hosts within enterprise sites 15 and 16, with access to enterprise switch 18 within enterprise site 14.

Service provider network 12 may be coupled to one or more networks (not shown) administered by other providers, and may thus form part of a large-scale public network infrastructure, e.g., the Internet. Service provider network 12, therefore, may provide hosts or endpoints within enterprise sites 14, 15, and 16 with access to the Internet. Router 17 may perform Layer 3 routing to route network traffic between enterprise switch 18 and enterprise sites 15, 16 using service provider network 12. Service provider network 12 may include a variety of network devices other than router 17, such as other provider edge (PE) routers, core routers, customer edge (CE) routers, and switches.

Although additional network devices are not shown for ease of explanation, enterprise network 10 may comprise additional networks, enterprise sites, and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of enterprise network 10 are illustrated as being directly coupled, one or more additional network elements may be included along any links between service provider network 12 and enterprise sites 14, 15, or 16, and any links between enterprise switch 18 and hosts 20, such that the network elements of enterprise network 10 are not directly coupled.

Although illustrated as a single switch in FIG. 1, enterprise switch 18 may include a plurality of network devices, e.g., routers and/or switches. For example, enterprise switch 18 may include a plurality of access or satellite devices interconnected via one or more aggregation devices. In some examples, the architecture of enterprise switch 18 comprises a multi-tiered architecture in which two tiers of access or satellite devices and aggregation devices are interconnected to forward data packets between hosts 20 within enterprise site 14 and from hosts 20 to other hosts within enterprise sites 15, 16 via service provider network 12. The interconnection between the aggregation device and satellite devices appear in enterprise network 10 as a single, port-dense device that is managed using a single IP address.

As described in more detail below with respect to FIG. 2A, an aggregation device included in enterprise switch 18 is connected to one or more access or satellite devices, and acts as a single point of management for the satellite devices. For example, the aggregation device centrally manages interface configuration for each satellite device interface. The aggregation device may add interfaces through interconnections with the satellite devices to expand the number of available network interfaces. For example, the aggregation device includes cascade ports for sending and receiving control and network traffic from satellite devices. The satellite devices each includes one or more host-facing ports, also referred to as extended ports, that transmit and receive network traffic from hosts 20, and are associated with the cascade ports of the aggregation device.

In general, the techniques of this disclosure are described with respect to an enterprise switch in an enterprise network used to provide access between hosts within the enterprise network. In other examples, the techniques of the disclosure may be similarly performed within a data center switch included in a data center network used to provide hosts with access to web sites, data, and services housed in a data center.

In some examples, an aggregation device allocates one or more resources (e.g., Quality of Service (QoS) queues, firewalls, etc.) for each of the extended ports of the satellite devices on the cascade ports of the aggregation device. While the resources are provisioned on the cascade ports of the aggregation device, the extended ports of the satellite devices utilize the resources (i.e., perform the classification, queuing, and scheduling) on the traffic. When multiple cascade ports of the aggregation device are configured to connect to a satellite device, the resources are typically allocated for each extended port and cascade port combination, such that any of the cascade ports may support traffic destined for any of the extended ports. However, allocating resources for each extended port and cascade port combination may lead to scaling limitations. For example, all of the extended ports of a satellite device interconnected with the aggregation device may require one million queues. If the aggregation device is configured with four cascade ports connecting to the satellite device, the aggregation device typically would need to allocate the one million queues for the extended ports on each of the four cascade ports, which results in four times the resources (e.g., four million queues) being consumed on the aggregation device.

This disclosure describes techniques for assigning an active and backup cascade port for each of the extended ports such that resources for the extended ports are allocated on only the active and backup cascade ports. This disclosure also describes techniques for steering traffic to an assigned backup cascade port and/or assigning a new active and backup cascade port pair in the event an active cascade port is unreachable. In this way, the techniques described herein may reduce the required resource utilization in the aggregation device and provide for seamless migration of traffic to another cascade port without any packet churning or packet loss.

Figure 2A:
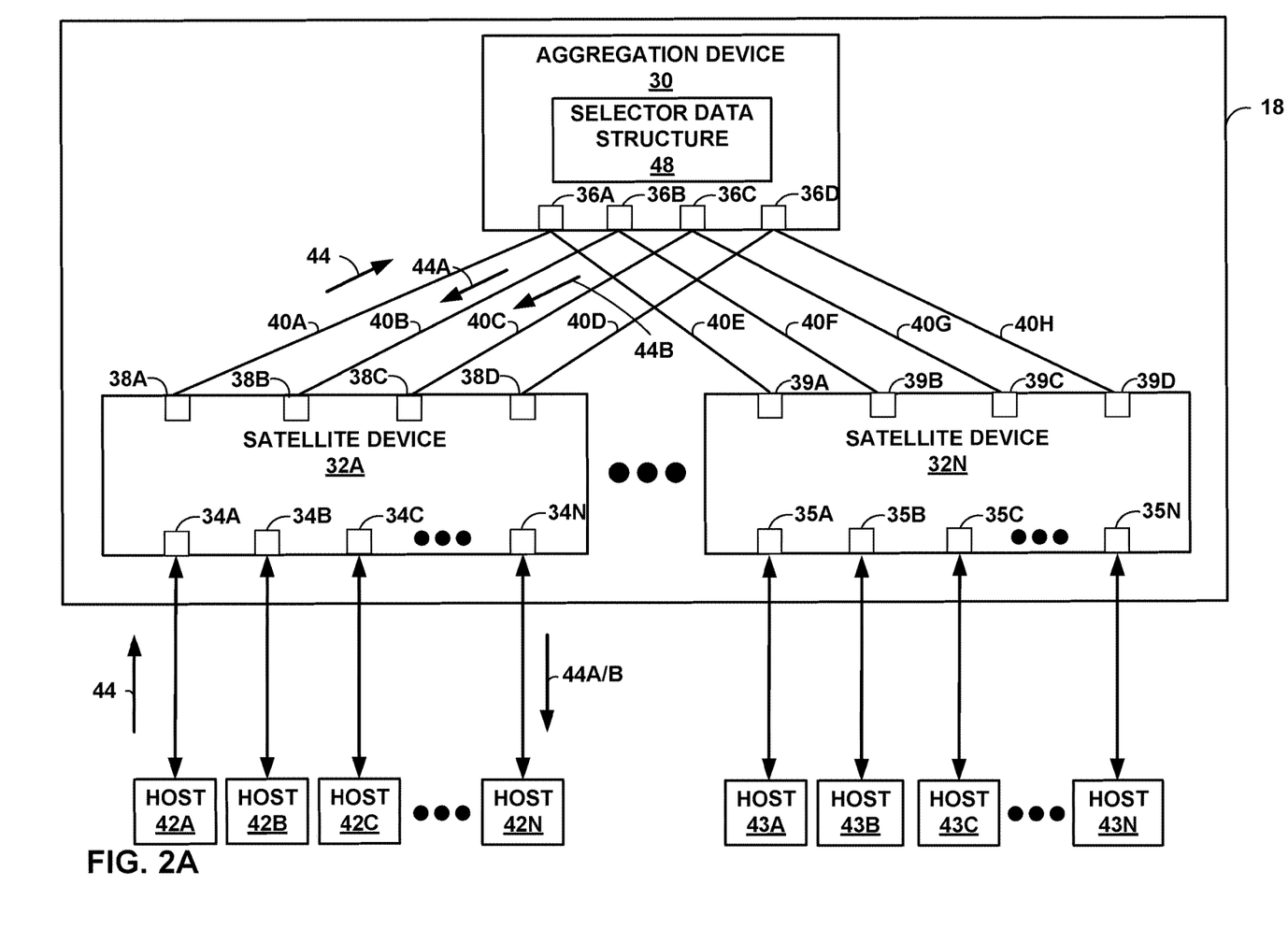
FIG. 2A is a block diagram illustrating an example of an enterprise switch including an aggregation device coupled to a plurality of satellite devices configured to operate in accordance with the techniques described in this disclosure.

FIG. 2A is a block diagram illustrating an example of enterprise switch 18 including aggregation device 30 that is configured to operate in accordance with the techniques described in this disclosure. The architecture illustrated in FIG. 2A is merely exemplary and, in other examples, enterprise switch 18 may conform to a different architecture.

Satellite devices 32A-32N (collectively, "satellite devices 32") form the access layer of enterprise switch 18 and provides hosts with access to the internal switch fabric of enterprise switch 18. In the example of FIG. 2A, satellite device 32A may provide hosts 42A-42N (collectively, "hosts 42") with access to the internal switch fabric of enterprise switch 18, and satellite device 32N may provide hosts 43A-43N (collectively, "hosts 43") with access to the internal switch fabric of enterprise switch 18. In other examples, more or fewer hosts may be connected, either multi-homed or singularly homed, to one or more of satellite devices 32. Satellite devices 32 may each provide layer 2, medium access control (MAC) address switching and/or layer 3, Internet Protocol (IP) address switching between the hosts. The host-facing ports of each of satellite devices 32 are referred to herein as extended ports. For example, satellite device 32A may include extended ports 34A-34N (collectively, "extended ports 34") and satellite device 32N may include extended ports 35A-35N (collectively, "extended ports 35"). Extended ports 34 and 35 may be capable of transmitting and receiving traffic from hosts 42 and 43, respectively.

Satellite devices 32 may include uplink ports that are each a physical interface that provides connection to aggregation device 30. For example, uplink ports 38A-38D provide connections for satellite device 32A to aggregation device 30, and uplink ports 39A-39D provide connections for satellite device 32N to aggregation device 30. Network and control traffic on satellite devices 32 that are transported to aggregation device 30 are sent or received on uplink ports 38 and 39. Uplink ports 38 and 39 may be a 10-gigabit/second (Gbps) small form-factor pluggable (SFP+) interface or a 40-Gbps quad small form-factor pluggable (QSFP+) interface, but may also be any interface on satellite devices 32 that connects satellite devices 32 to aggregation device 30.

Aggregation device 30 comprises a plurality of cascade ports 36A-36D (collectively, "cascade ports 36") that are physical interfaces on aggregation device 30 that provide connectivity to one or more satellite devices, e.g., satellite devices 32. Aggregation device 30 may configure one or more cascade port connections with each of satellite devices 32 over which control and network traffic is sent and received. For example, cascade ports 36A-36D connect to uplink ports 38A-38D, respectively, on satellite device 32A via links 40A-40D, and cascade ports 36A-36D connect to uplink ports 39A-39D, respectively, on satellite device 32N via links 40E-40H. Each of links 40A-40H (collectively, "links 40") may include an interface on each end of the link. The interface on the aggregation device end of the link is a cascade port, and the interface on the satellite device end of the link is an uplink port. Each of cascade ports 36 may be a 10-gigabit/second (Gbps) SFP+ interface or a 40-Gbps QSFP+ interface, but may also be any interface on aggregation device 30 that connects satellite devices 32 to aggregation device 30.

Aggregation device 30 centrally manages satellite devices 32, therefore eliminating the need to manage satellite devices 32 individually, which reduces the overhead associated with configuring, monitoring, and upgrading satellite devices 32. To facilitate the centralized management, aggregation device 30 may configure connections between cascade ports 36 of aggregation device 30 and satellite devices 32. Each of extended ports 34 of satellite devices 32 may include an identifier, e.g., Flexible PIC Concentrator identifier (FPC ID) that is mapped to one or more of cascade ports 36. As one example, extended port 34A of satellite device 32A may include an FPC ID of 110, and cascade port 36A of aggregation device 30 may include a port ID of xe-0/0/2. To configure a connection between aggregation device 30 and satellite device 32A, aggregation device 30 may map the FPC ID of 110 of extended port 34A to the xe-0/0/2 port ID of cascade port 36A such that extended port 34A is associated with cascade port 36A.

Based on the configured connections, extended ports 34 may appear as additional interfaces to be managed by aggregation device 30. In the example of FIG. 2A, aggregation device 30 may handle traffic for extended ports 34A-34N on satellite device 32A and handle traffic for extended ports 35A-35N for satellite device 32N.

Aggregation device 30 provides one or more resources, such as Quality of Service (QoS) queues or firewalls, for use by extended ports 34, 35. As one example, aggregation device 30 may include QoS hardware queues used to facilitate controlled sharing of network bandwidth for forwarding packets. In one example, each of hosts 42 may have a particular priority associated with a service level subscription (i.e., host 42A may have a higher priority to access services, whereas host 42C may have a lower priority to access server). Extended ports 34 of satellite devices 32 may need the QoS hardware queues provisioned on aggregate device 30 to facilitate controlled sharing of network bandwidth for forwarding packets based on the priorities to hosts 42. Additional examples regarding the queues are described in U.S. Pat. No. 8,230,110, entitled "WORK-CONSERVING PACKET SCHEDULING IN NETWORK DEVICES," filed Jul. 13, 2010, and U.S. patent application Ser. No. 15/819,265, entitled "HIERARCHICAL NETWORK TRAFFIC SCHEDULING USING DYNAMIC NODE WEIGHTING," filed Nov. 21, 2017, the entire contents of which are incorporated by reference herein.

Traditionally, when multiple cascade ports are used to connect between an aggregation device and a satellite device, the resources provided by the aggregation device for the extended ports of the satellite device are allocated for each extended port-cascade port combination. In this way, any of the cascade ports of the aggregation device can be used to reach any of the extended ports of the satellite device. The aggregation device, therefore, can load-balance traffic across all of its cascade ports. However, the requirement that any of the cascade ports can be used to reach any of the extended ports, may lead to scaling limitations regarding the amount of resources needed to support every extended port-cascade port combination. For example, on a typical system with four cascade ports between the aggregation device and the satellite device, this translates to four times the resources needed at the aggregation device to support the extended port-cascade port combinations.

As a more specific example of the resource scaling issue, a customer may request the support of QoS hardware queues for a configuration in which there are 8 satellite devices per aggregation device, 4 cascade ports per satellite device (which results in 32 cascade ports per aggregation device), and 3 line cards per aggregation device (which results in approximately 11 cascade ports per FPC). The configuration may further include 40 extended port physical interfaces per satellite device, 500 logical interfaces (IFLs) per physical interface, and 10 interface sets per extended port. In this example, the number of QoS hardware queues needed is around 224,400 per FPC of the aggregation device (e.g., 11 cascade ports per FPC*40 extended ports per satellite device * (500 IFLs per extended port +10 interface sets per extended port)). In some examples, however, the number of QoS hardware queues available on an FPC is 131,068. Therefore, compromises are needed to meet these scaling limitations. For example, conventional aggregation devices may need to reduce the number of cascade ports per satellite device or the number of extended port interfaces as a compromise to the scaling limitations.

The techniques of this disclosure attempt to solve the above described issue of the hardware resource crunch by providing targeted cascade port selection for each extended port with a flexible fallback option to reduce the required hardware allocation at the aggregation device. In accordance with the techniques described herein, aggregation device 30 assigns active and backup cascade ports for each extended port of a satellite device such that resources are allocated only to the active and backup cascade ports on aggregation device 30, instead of all of the cascade ports. In the example of FIG. 2A, aggregation device 30 may assign one of cascade ports 36 as an active cascade port and another one of cascade ports 36 as a backup cascade port for each of extended ports 34 and/or 35. For example, aggregation device 30 may assign cascade port 36B as an active cascade port and cascade port 36C as backup cascade port for extended port 34A, and may similarly assign various active and backup cascade port combinations for each of extended ports 34B-34N. Aggregation device 30 may assign an even distribution of the cascade ports as active and backup cascade ports such that aggregation device 30 may effectively load-balance across all the cascade ports. Aggregation device 30 may also allocate resources (e.g., QoS hardware queues) only for the assigned active and backup cascade ports instead of all the cascade ports.

In operation, extended port 34A of satellite device 32A may receive packet 44 from host 42A destined for host 42N. Traffic sent between aggregation device 30 and satellite devices 32 is sent over a logical path, referred to herein as "E-channel." Satellite device 32A may insert an E-channel tag (ETAG) header to the packet. The ETAG header may include an E-channel identifier (ECID) value that is assigned by aggregation device 30 and identifies the source or destination extended port on satellite devices 32. In the example of FIG. 2A, satellite device 32A may insert in packet 44 an ETAG header that carries an ECID value identifying extended port 34A of satellite device 32A as the source extended port.

Satellite device 32A load-balances the packet on one of uplink ports 38A-38D to forward packet 44 to aggregation device 30. For example, satellite device 32A may perform a hash algorithm on packet 44, and based on a per-packet hash that is computed using key fields in packet 44, one of the uplink port connections is selected to forward packet 44 to aggregation device 30. In the example of FIG. 2, satellite device 32A may select uplink port 38A to forward packet 44 to aggregation device 30.

Cascade port 36A of aggregation device 30 may receive packet 44 and extract the ECID value identifying extended port 34A from the ETAG header and determine that the packet is sourced from extended port 34A of satellite device 32A. Aggregation device 30 then removes the ETAG header from the packet. Aggregation device 30 performs a lookup for host 42N in its forwarding information and the result of the lookup is extended port 34N of satellite device 32A.

Rather than load-balancing packet 44 through any of cascade ports 36A-36D to reach satellite device 32A, aggregation device 30 may forward packet 44 through an assigned active or backup cascade port. As further described below with respect to FIGS. 4A and 4B, selector data structure 48 may include entries for identifying active and backup cascade ports assigned to each of extended ports 34. For example, selector data structure 48 may include respective indices associated with a corresponding active and backup cascade pair. Aggregation device 30 may perform a lookup of selector data structure 48 to determine an active or backup cascade port assigned to the destination extended port. In the example of FIG. 2A, aggregation device 30 may identify an extended port ID from packet 44, e.g., extended port index, based on one or more key fields in packet 44. Aggregation device 30 may perform a lookup of selector data structure 48 based on the index and determine that cascade port 36B is the assigned active cascade port for extended port 34N.

Aggregation device 30 may insert a new ETAG header and ECID value in packet 44 identifying extended port 34N of satellite device 32A as the destination extended port and may forward packet 44 (represented as packet 44A in FIG. 2A) through the active cascade port, e.g., cascade port 36B, to uplink port 38B of satellite device 32A.

Uplink port 38B of satellite device 32A receives packet 44 and extracts the ECID value from the ETAG header. In this example, satellite device 32A maps the ECID value identifying extended port 34N to extended port 34N and forwards packet 44 to host 42N.

In the event of an active cascade port is temporarily unreachable (e.g., resulting from link flap), aggregation device 30 may steer packets to an assigned backup cascade port. In the example of FIG. 2A, assume that active cascade port 36B becomes temporarily unreachable. In this example, aggregation device 30 may identify the extended port ID, e.g., extended port 34N, from packet 44 and may perform a lookup of selector data structure 48 based on the index and determine that cascade port 36C is the assigned backup cascade port for extended port 34N.

Aggregation device 30 may steer packet 44 (represented as packet 44B in FIG. 2A) to cascade port 36C in which packet 44B is forwarded to uplink port 38C of satellite device 32A. If the assigned cascade port, e.g., cascade port 36B, becomes reachable, aggregation device 30 may steer packets back to active cascade port 36B. In this way, when an active cascade port is temporarily unreachable, aggregation device 30 may steer traffic to an assigned backup cascade port (and back to the assigned active cascade port) without any packet churning as the resources provisioned on aggregation device 30 are already allocated to the assigned backup cascade port.

In some examples, aggregation device 30 may assign new active and backup cascade ports in the event a cascade port may become permanently unreachable or unreachable for a specified period of time. In this example, aggregation device 30 may assign new active and/or backup cascade ports within selector data structure 48 (otherwise referred to herein as rebalancing). Aggregation device 30 may assign new active and/or backup cascade ports within selector data structure 48 with an even distribution of the remaining reachable cascade ports. In the example of FIG. 2A, assume that cascade port 38B is unreachable. Aggregation device 30 may determine if cascade port 38B remains unreachable for a specified duration of time. If cascade port 38B is unreachable for the specified duration of time, aggregation device 30 may assign new active and backup cascade ports within selector data structure 48 where cascade port 38B is assigned as an active cascade port. In some examples, aggregation device 30 may reassign the cascade ports initially assigned as backup cascade ports as new active cascade ports, respectively, and assign another one of cascade ports 36 as a new backup cascade port. For example, aggregation device 30 may reassign backup cascade port 36C as a new active cascade port and assign either cascade ports 38A or 38D as a new backup cascade port. In other examples, aggregation device 30 may assign new active and backup cascade ports that were not previously assigned. For example, aggregation device 30 may assign cascade port 36A as the new active cascade port and assign cascade port 36D as the new backup cascade port for the particular index. In any event, aggregation device 30 may assign active and backup cascade ports with an even distribution from among cascade ports 36A, 36C, and 36D to preserve load-balancing across the remaining reachable cascade ports of aggregation device 30.

In some examples, if another cascade port becomes unreachable, e.g., cascade port 36A, aggregation device 30 may again rebalance traffic over the remaining cascade ports, e.g., cascade ports 36C and 36D, by assigning active and backup cascade ports with an even distribution from among cascade ports 36C and 36D.

In this way, various technical advantages may be achieved. For example, by assigning active and backup cascade ports for each extended port, aggregation device 30 may allocate resources for each of the extended ports only on the assigned active and backup cascade ports for the respective one of the extended ports, thereby reducing the amount of resources utilized by the aggregation device. Moreover, with the assignment of active and backup cascade ports for each extended port, traffic forwarded between an aggregation device and satellite devices is not disrupted when one or more cascade ports become unreachable.

Figure 2B:
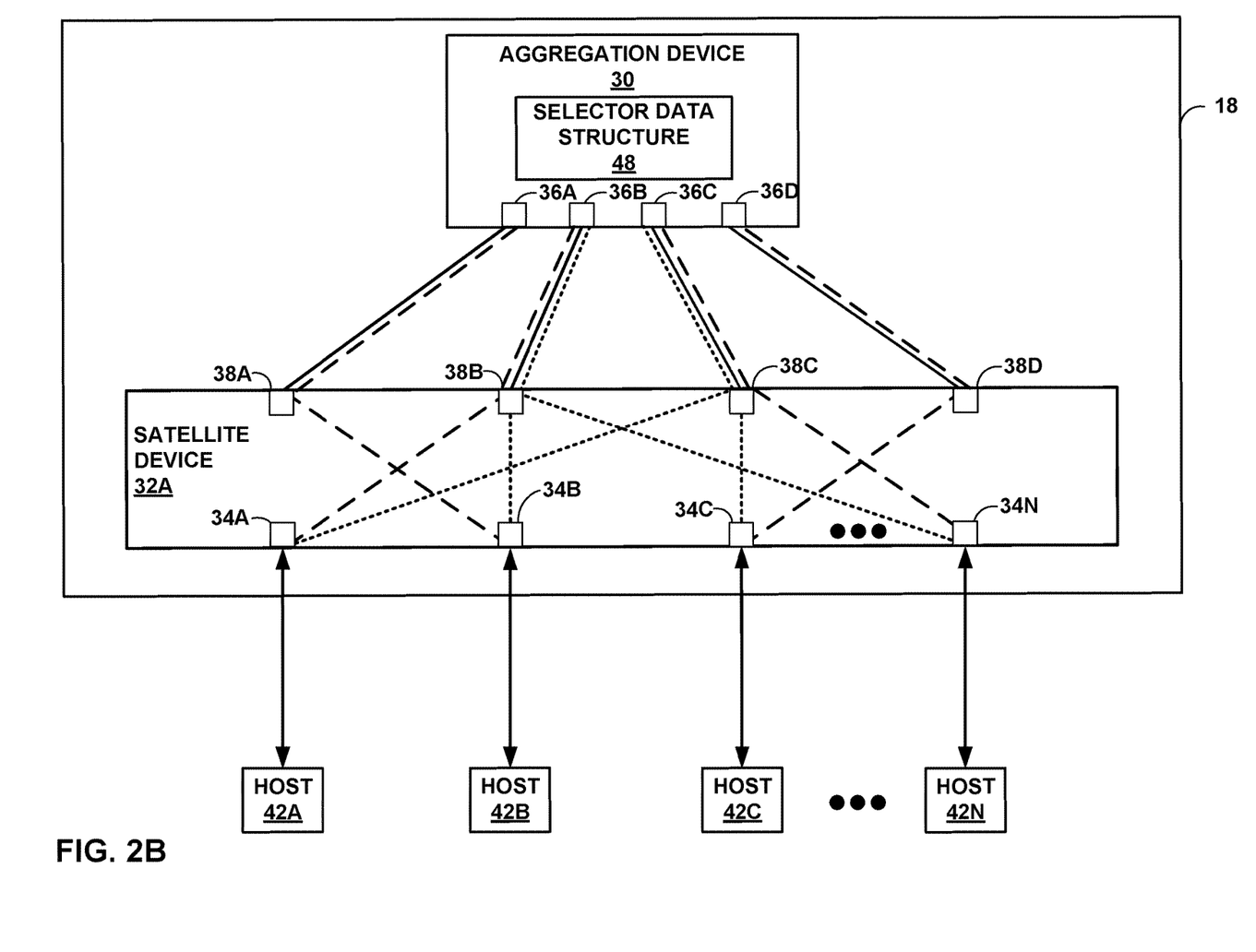
FIG. 2B is a conceptual diagram illustrating an example assignment of active and backup cascade ports of an aggregation device for extended ports of a satellite device, in accordance with the techniques described in this disclosure.

FIG. 2B is a conceptual diagram illustrating example assignments of active and backup cascade ports, in accordance with the techniques described in this disclosure. FIG. 2B may represent example assignments of active and backup cascade ports to extended ports 34A-34N of satellite device 32A in FIG. 2A.

In the example of FIG. 2B, aggregation device 30 may assign within selector data structure 48 active and backup cascade ports from cascade ports 36A-36D for each of extended ports 34A-34N (collectively, extended ports 34"). For example, for extended port 34A, aggregation device 30 may assign cascade port 36B as an active cascade port (illustrated as a dashed line between cascade port 36B and extended port 34A) and assign cascade port 36C as a backup cascade port (illustrated as a dotted line between cascade port 36C and extended port 34A). For extended port 34B, aggregation device 30 may assign cascade port 36A as an active cascade port (illustrated as a dashed line between cascade port 36A and extended port 34B) and assign cascade port 36B as a backup cascade port (illustrated as a dotted line between cascade port 36B and extended port 34B). For extended port 34C, aggregation device 30 may assign cascade port 36D as an active cascade port (illustrated as a dashed line between cascade port 36D and extended port 34C) and assign cascade port 36C as a backup cascade port (illustrated as a dotted line between cascade port 36C and extended port 34C). For extended port 34N, aggregation device 30 may assign cascade port 36C as an active cascade port (illustrated as a dashed line between cascade port 36C and extended port 34N) and assign cascade port 36B as a backup cascade port (illustrated as a dotted line between cascade port 36B and extended port 34N).

In the example of FIG. 2B, aggregation device 30 may receive a packet destined for extended port 34A. Aggregation device 30 may perform a lookup of selector data structure 48 and determine that cascade port 36B is assigned as an active cascade port for extended port 34A and forward the packet through cascade port 36B to uplink port 38B of satellite device 32A. Aggregation device 30 may alternatively, or additionally, receive a packet destined for extended port 34B. In this example, aggregation device 30 may perform a lookup of selector data structure 48 and determine that cascade port 36A is assigned as an active cascade port for extended port 34B and forward the packet through cascade port 36A to uplink port 38A of satellite device 32A. Aggregation device 30 may alternatively, or additionally, receive a packet destined for extended port 34C. In this example, aggregation device 30 may perform a lookup of selector data structure 48 and determine that cascade port 36D is assigned as an active cascade port for extended port 34C and forward the packet through cascade port 36D to uplink port 38D of satellite device 32A. Aggregation device 30 may alternatively, or additionally, receive a packet destined for extended port 34N. In this example, aggregation device 30 may perform a lookup of selector data structure 48 and determine that cascade port 36C is assigned as an active cascade port for extended port 34N and forward the packet through cascade port 36C to uplink port 38C of satellite device 32A.

In the event one or more of cascade ports 36 are temporarily unreachable, aggregation device 30 may, based on a lookup of selector data structure 48, select an assigned backup cascade port to forward a packet to satellite device 32A. For example, if aggregation device 30 receives a packet destined for extended port 34A and cascade port 36B is temporarily unreachable, aggregation device 30 may perform a lookup of selector data structure 48 and determine that cascade port 34C is assigned as a backup cascade port for extended port 34A and forward the packet through cascade port 36C to uplink port 38C of satellite device 32A. Alternatively, or additionally, if aggregation device 30 receives a packet destined for extended port 34B and cascade port 36A is temporarily unreachable, aggregation device 30 may perform a lookup of selector data structure 48 and determine that cascade port 36B is assigned as a backup cascade port for extended port 34B and forward the packet through cascade port 36B to uplink port 38B of satellite device 32A. Alternatively, or additionally, if aggregation device 30 receives a packet destined for extended port 34C and cascade port 36D is temporarily unreachable, aggregation device 30 may perform a lookup of selector data structure 48 and determine that cascade port 36C is assigned as a backup cascade port for extended port 34C and forward the packet through cascade port 36C to uplink port 38C of satellite device 32A. Alternatively, or additionally, if aggregation device 30 receives a packet destined for extended port 34N and cascade port 36C is temporarily unreachable, aggregation device 30 may perform a lookup of selector data structure 48 and determine that cascade port 36B is assigned as a backup cascade port for extended port 34N and forward the packet through cascade port 36B to uplink port 38B of satellite device 32A. In the examples above, if the assigned active cascade port becomes reachable, aggregation device 30 may steer traffic back to the assigned active cascade port for forwarding traffic to satellite device 32A.

In some examples, aggregation device 30 may assign new active cascade ports and backup cascade ports in the event one or more of cascade ports 36 are permanently unreachable or unreachable for a specified period of time. In the example of FIG. 2B, assume that cascade port 36B is permanently unreachable or unreachable for a specified period of time. For entries within selector data structure 48 that cascade port 38B is assigned as an active cascade port, aggregation device 30 may assign new active and backup cascade ports. In this example, aggregation device 30 may assign new active and backup cascade port pairs for extended port 34A. For extended port 34A, aggregation device 30 may reassign cascade port 36C initially assigned as a backup cascade port as a new active cascade port, and assign another one of cascade ports 36, e.g., cascade port 36A, as a new backup cascade port. In some examples (not shown), aggregation device 30 may assign new active and backup cascade ports that were not previously assigned as either active or backup cascade ports. For example, aggregation device 30 may assign cascade port 36A as the new active cascade port and assign cascade port 36D as the new backup cascade port for extended port 34A.

In some examples, aggregation device 30 may also assign new backup cascade ports for entries within selector data structure 48 that the unreachable cascade port 36B is assigned as a backup cascade port, e.g., extended ports 34B and 34N.

Figure 3:
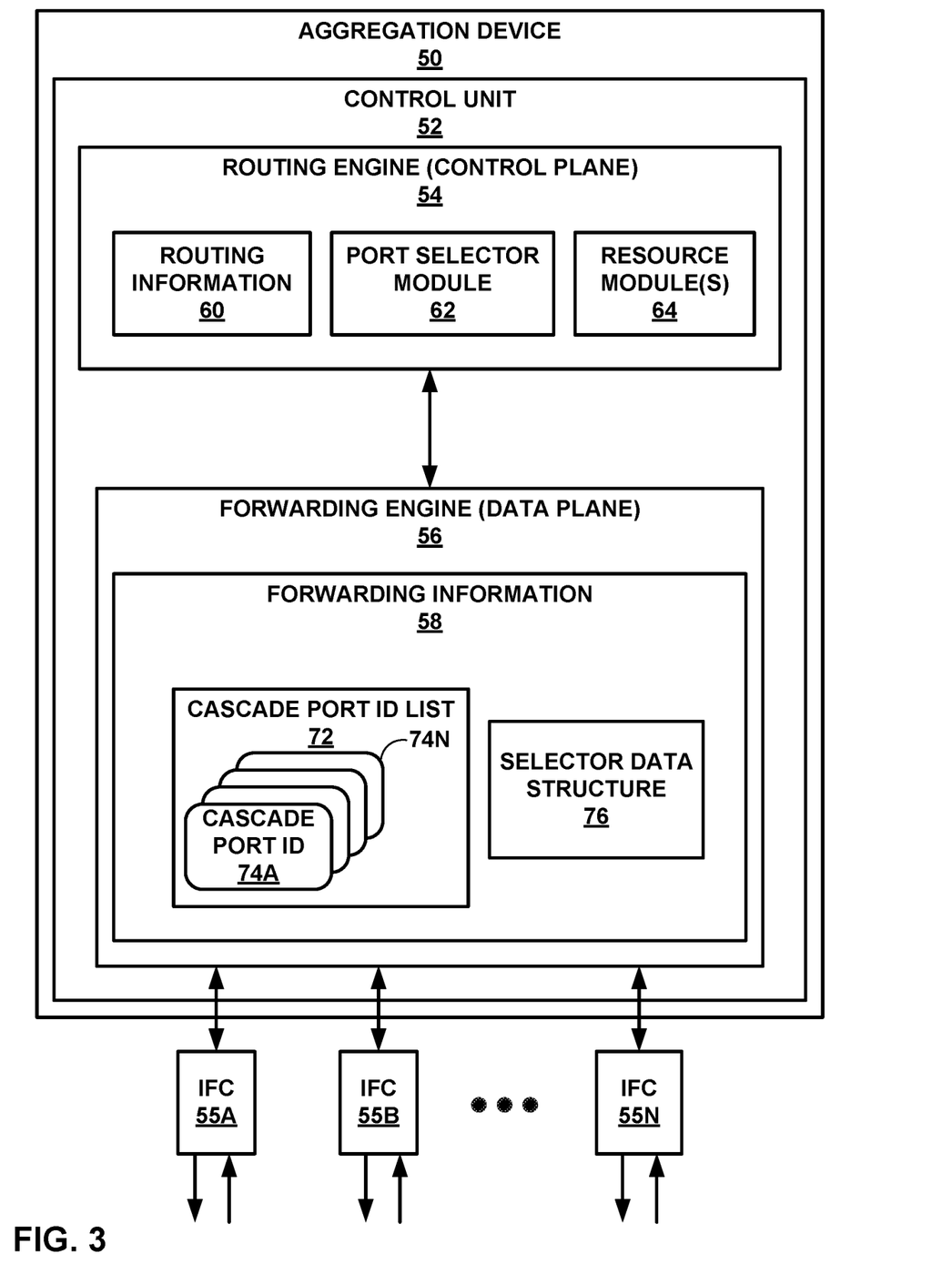
FIG. 3 is a block diagram illustrating an example of an aggregation device within an enterprise switch, in accordance with techniques of this disclosure.

FIG. 3 is a block diagram illustrating an example of an aggregation device 50 within an enterprise switch, such as aggregation device 30 from FIGS. 1, 2A and 2B, in accordance with techniques described in this disclosure. Aggregation device 50 may comprise a network device, such as a router and/or a switch. Aggregation device 50 may be configured to operate substantially similar to aggregation device 30 from FIGS. 2A and 2B.

In the illustrated example of FIG. 3, aggregation device 50 includes a control unit 52 that provides control plane functionality for the network device. Control unit 52 may include a routing engine 54 coupled to a forwarding engine 56. Aggregation device 50 includes interface cards 55A-55N (collectively, "IFCs 55") that receive packets via inbound links and send packets via outbound links. IFCs 55 typically have one or more physical network interface ports (e.g., cascade ports 36 of FIGS. 2A and 2B).

Routing engine 54 provides an operating environment for various protocols (not shown) that execute at different layers of a network stack. Routing engine 54 is responsible for the maintenance of routing information 60 to reflect the current topology of a network and other network entities to which aggregation device 50 is connected. In particular, routing protocols periodically update routing information 60 to accurately reflect the topology of the network and other entities based on routing protocol messages received by aggregation device 50.

The protocols may be software processes executing on one or more processors. For example, routing engine 54 may include bridge port extension protocols, such as IEEE 802.1BR. Routing engine 54 may also include network protocols that operate at a network layer of the network stack. In the example of FIG. 3, network protocols may include one or more control and routing protocols such as border gateway protocol (BGP), internal gateway protocol (IGP), label distribution protocol (LDP) and/or resource reservation protocol (RSVP). In some examples, the IGP may comprise the open shortest path first (OSPF) protocol or the intermediate system-to-intermediate system (IS-IS) protocol. Routing engine 54 also may include one or more daemons that comprise user-level processes that run network management software, execute routing protocols to communicate with peer routers or switches, maintain and update one or more routing tables, and create one or more forwarding tables for installation to forwarding engine 56, among other functions.

Routing information 60 may include, for example, route data that describes various routes within the network, and corresponding next hop data indicating appropriate neighboring devices within the network for each of the routes. Aggregation device 50 updates routing information 60 based on received advertisements to accurately reflect the topology of the network.

Based on routing information 60, routing engine 54 generates forwarding information 58 and installs forwarding data structures (e.g., cascade port list 72 and selector data structure 76) into forwarding information 58 within forwarding engine 56 in the forwarding plane. Forwarding information 58 associates network destinations with specific next hops and corresponding interface ports within the forwarding plane.

Routing engine 54 may include a port selector module 62 for assigning active and backup cascade ports to each extended port in selector data structure 76, in accordance with the techniques described herein. For each extended port entry in selector data structure 76, port selector module 62 may assign a cascade port included in one of IFCs 55 as an active cascade port and assign a cascade port included in another one of IFCs 55 as a backup cascade port. Routing engine 54 may install the selector data structure 76 in forwarding information 58 of forwarding engine 56 such that forwarding engine 56 may determine the cascade port to forward traffic, as further described below.

Routing engine 54 may include one or more resource modules 64 for configuring resources for extended ports and uplink ports on satellite devices interconnected to aggregation device 50. Resource modules 64 may include a scheduler module for configuring Quality of Service (QoS) policies, firewall module for configuring firewall policies, or other modules for configuring a resource for network devices. Port selector module 62 may instruct the one or more resource modules 64 to allocate resources only on assigned active and backup cascade ports for each extended port. As one example, resource module 64 may allocate QoS queues for an extended port only on the assigned active cascade port (e.g., a cascade port included in IFC 55A) and the assigned backup cascade port (e.g., a cascade port included in IFC 55B). In this way, for each extended port, aggregation device 50 only allocates resources on the assigned active and backup cascade ports, instead of all of the cascade ports, thereby reducing resource utilization in aggregation device 50.

Forwarding engine 56 represents hardware and logic functions that provide high-speed forwarding of network traffic. Forwarding engines 56 typically includes a set of one or more forwarding chips programmed with forwarding information that maps network destinations with specific next hops and the corresponding output interface ports. In the example of FIG. 3, forwarding engine 56 includes forwarding information 58. In accordance with routing information 60, forwarding engine 56 maintains forwarding information 58 that associates network destinations with specific next hops and corresponding interface ports (e.g., extended ports 34). For example, routing engine 54 analyzes routing information 60 and generates forwarding information 58 in accordance with routing information 60. Forwarding information 58 may be maintained in the form of one or more tables, link lists, radix trees, databases, flat files, or any other data structures.

Forwarding information 58 may include a cascade port list 74 having a list of unicast next hops. Cascade port list 72 may include a list cascade port identifiers 74A-74N (collectively, "cascade port identifiers 74") associated with cascade ports included in IFCs 55 coupled to aggregation device 50. Cascade port identifier 74 may represent an identifier of any of cascade ports 36 of FIG. 2A or 2B. Forwarding information 58 may also include selector data structure 76 used to identify respective active or backup cascade ports used to reach a corresponding extended port.

As one example, forwarding engine 56 may generate a unilist next hop to an extended port of satellite device 32. Based on the cascade port list 72 and selector data structure 76, forwarding engine 56 may determine which assigned cascade port of IFCs 55 to forward the packet to reach the extended port. For example, forwarding engine 56 may identify from key fields of a packet an extended port identifier (e.g., extended port index) that is used to determine within selector data structure 76 an active and/or backup cascade port associated with an extended port.

Although not shown in FIG. 3, forwarding engine 56 may comprise a central processing unit (CPU), memory and one or more programmable packet-forwarding application-specific integrated circuits (ASICs).

The architecture of aggregation device 50 illustrated in FIG. 3 is shown for exemplary purposes only. The disclosure is not limited to this architecture. In other examples, aggregation device 50 may be configured in a variety of ways. In one example, some of the functionally of routing engine 54 and forwarding engine 56 may be distributed within IFCs 55.

Elements of control unit 52 may be implemented solely in software, or hardware, or may be implemented as combinations of software, hardware, or firmware. For example, control unit 52 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 52 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of aggregation device 50, e.g., protocols. Control unit 52, in some examples, retrieves and executes the instructions from memory for these aspects.

Figure 4A:
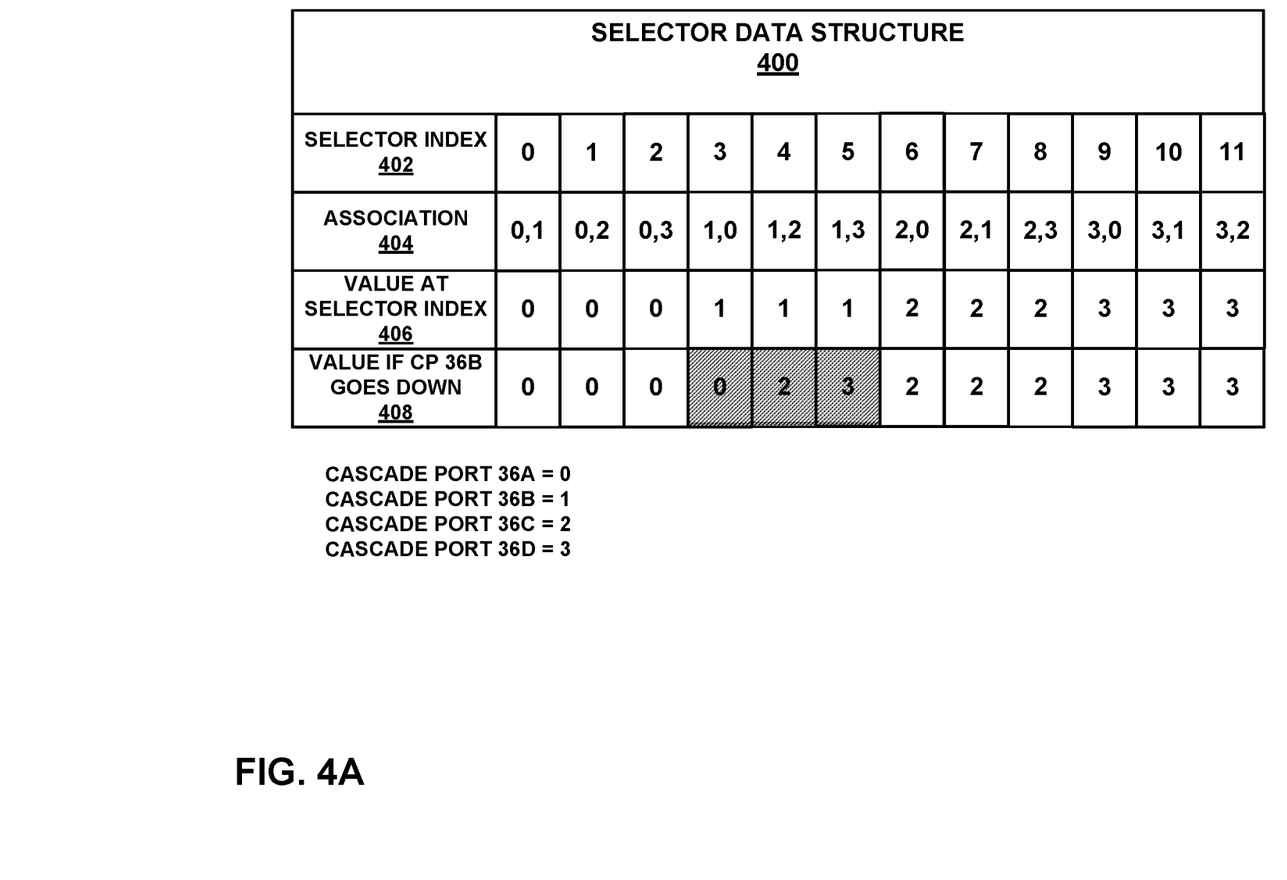
FIG. 4A is an example selector data structure having entries in accordance with a temporarily unreachable cascade port, configured in accordance with techniques described in this disclosure.
Figure 4B:
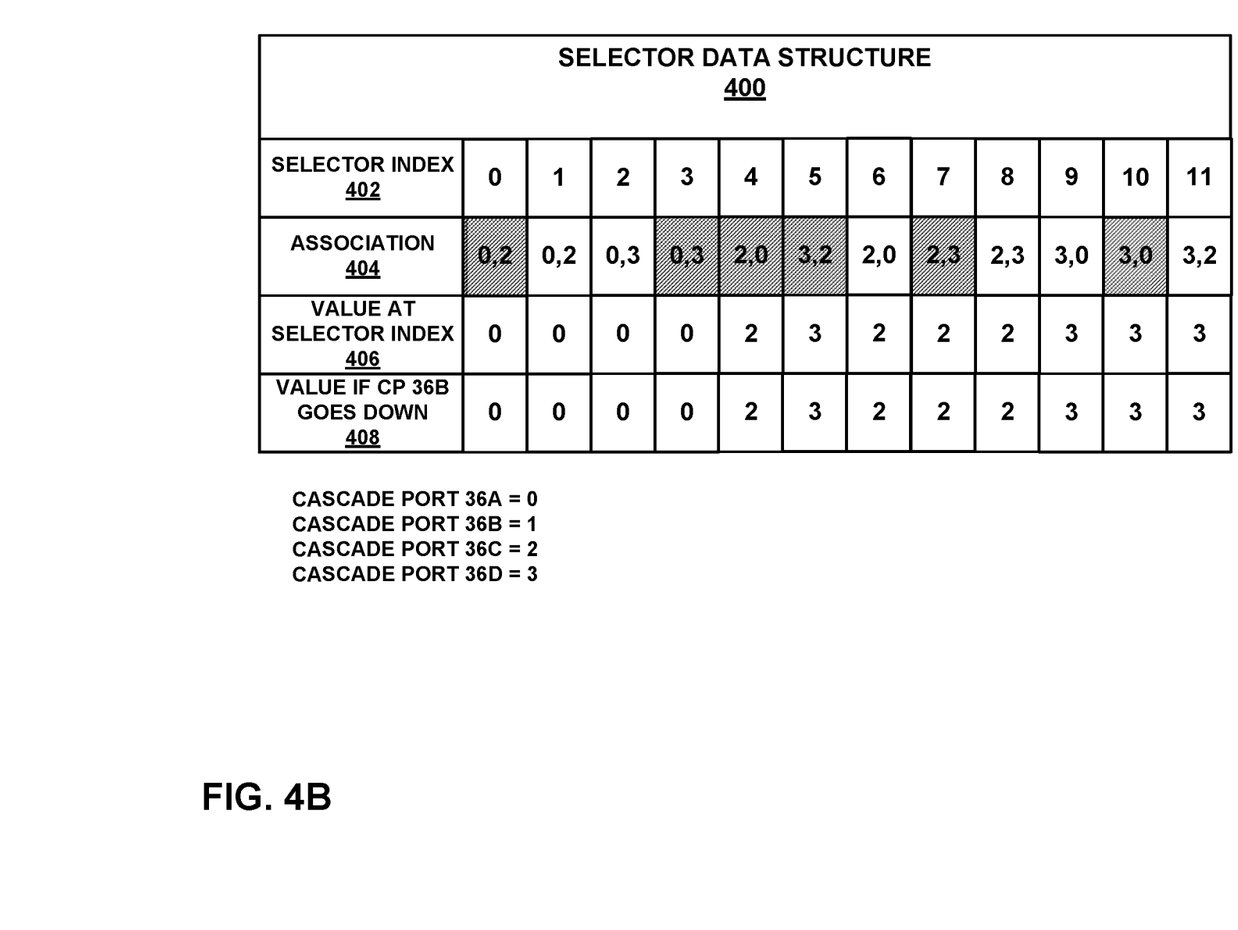
FIG. 4B is an example selector data structure having entries in accordance with a permanently unreachable cascade port, configured in accordance with techniques described in this disclosure.

FIGS. 4A and 4B are examples of a selector data structure configured in accordance with the techniques described in this disclosure. Selector data structure 400 of FIGS. 4A and 4B may represent selector data structure 48 of FIGS. 2A and 2B, and selector data structure 76 of FIG. 3. Selector data structure 400 of FIG. 4A will be described with respect to an instance where cascade port 36B is temporarily unreachable, but may include different entries in accordance with any of cascade ports 36 that is temporarily unreachable.

In the example of FIG. 4A, selector data structure 400 may include selector index entries 402, association of active and backup cascade ports entries 404 ("association entries 404"), value at selector index entries 406 (i.e., the active cascade port), and value if cascade port 36B is unreachable entries 408.

Selector index entries 402 may include an index for each active and backup cascade port combination. For example, aggregation device 30 may include four cascade ports (i.e., cascade ports 36A-36D of FIG. 2A), which results in twelve different active and backup cascade port combinations for extended ports 34A-34N. A port selector module of the aggregation device (e.g., port selector module 62 of FIG. 3) may configure selector index entries 402 from 0 through 11 in selector data structure 400. Each of selector index entries 402 may represent a different active and backup cascade port pair. For example, aggregation device 30 may assign an even distribution of the cascade ports as active and backup cascade ports such that aggregation device may effectively load-balance across all the cascade ports. In this way, aggregation device 30 may select an index from selector index entries 402 to select from an equal distribution of active and backup cascade port pairs for which to forward traffic. As described further below, aggregation device 30 may select one of selector index entries 402 to determine a particular active and/or backup cascade port for forwarding a packet to satellite device 32A.

Association entries 404 may include the association of active and backup cascade ports for a particular selector index 402. Assume for example cascade port 36A has an identifier value of "0", cascade port 36B has an identifier value of "1", cascade port 36C has an identifier value of "2", and cascade port 36D has an identifier value of "3". In the example of FIG. 4A, selector index "0" is associated with cascade port 36A ("0") assigned as an active cascade port and cascade port 36B ("1") assigned as a backup cascade port. Selector index "1" is associated with cascade port 36A ("0") assigned as an active cascade port and cascade port 36C ("2") assigned as a backup cascade port. Selector index "2" is associated with cascade port 36A ("0") assigned as an active cascade port and cascade port 36D ("3") assigned as a backup cascade port. Selector index "3" is associated with cascade port 36B ("1") assigned as an active cascade port and cascade port 36A ("0") assigned as a backup cascade port. Selector index "4" is associated with cascade port 36B ("1") assigned as an active cascade port and cascade port 36C ("2") assigned as a backup cascade port. Selector index "5" is associated with cascade port 36B ("1") assigned as an active cascade port and cascade port 36D ("3") assigned as a backup cascade port. Selector index "6" is associated with cascade port 36C ("2") assigned as an active cascade port and cascade port 36A ("0") assigned as a backup cascade port. Selector index "7" is associated with cascade port 36C ("2") assigned as an active cascade port and cascade port 36B ("1") assigned as a backup cascade port. Selector index "8" is associated with cascade port 36C ("2") assigned as an active cascade port and cascade port 36D ("3") assigned as a backup cascade port. Selector index "9" is associated with cascade port 36D ("3") assigned as an active cascade port and cascade port 36A ("0") assigned as a backup cascade port. Selector index "10" is associated with cascade port 36D ("3") assigned as an active cascade port and cascade port 36B ("1") assigned as a backup cascade port. Selector index "11" is associated with cascade port 36D ("3") assigned as an active cascade port and cascade port 36C ("2") assigned as a backup cascade port.

The value at selector index entries 406 may include the active cascade port identifier from association entries 404. In the example of FIG. 4A, in response to a lookup of indices "0" through "2" of selector index entries 402 identifies cascade port 36A as the assigned active cascade port, a lookup of indices "3" through "5" of selector index entries 402 identifies cascade port 36B as the assigned active cascade port, a lookup of indices "6" through "8" of selector index entries 402 identifies cascade port 36C as the assigned active cascade port, and a lookup of indices "9" through "11" of selector index entries 402 identifies cascade port 36D as the assigned active cascade port.

The value if cascade port 36B goes down entries 408 identifies the cascade port used to forward traffic if cascade port 36B is temporarily unreachable. For example, if cascade port 36B ("1") is temporarily unreachable, a lookup of indices "3" through "5" of selector index entries 402 identifies corresponding backup cascade ports used to forward the packet (illustrated in FIG. 4A as shaded entries). For instance, if cascade port 36B is temporarily unreachable, a lookup of selector index "3" identifies cascade port 36A as the assigned backup cascade port. If cascade port 36B is temporarily unreachable, a lookup of selector index "4" identifies cascade port 36C as the assigned backup cascade port. If cascade port 36B is temporarily unreachable, a lookup of selector index "5" identifies cascade port 36D as the assigned backup cascade port. A lookup of other selector indices, e.g., 0-2, 6-11, identifies the corresponding active cascade ports from association entries 404.

To select one of selector index entries 402, aggregation device 30 may compute the following equation:

$$\text{Selector\_Index} = \text{EP\_Index} \bmod N$$

EP_Index is an index number allocated for each of extended ports 34A-34N of satellite device 32A, and N is the number of active and backup cascade port combinations. Assume for example, satellite device 32A has 41 extended ports. In this example, aggregation device configures an EP_Index from 0-40 for the 41 extended ports of satellite device 32A. With four cascade ports, e.g., cascade ports 36A-36D, there are twelve active and backup cascade port combinations for the extended ports. Aggregation device 30 may compute a modulus of EP_Index (any value from "0" through "40") and N ("12") to compute a selector index used to select a corresponding active and/or backup cascade port assigned to an extended port within selector data structure 400. Although satellite device 32A is illustrated with 41 extended ports, satellite device 32A may include any number of extended ports for which aggregation device 30 may allocate an index for each of the extended ports.

For example, aggregation device 30 may receive a packet and identify an extended port identifier (e.g., EP_Index) from the packet. In this example, aggregation device 30 may determine an EP_Index of "16". Using the EP_Index of 16, aggregation device 30 may compute a selector index of "4" based on the modulus computation above and determine from selector data structure 400 that cascade port 36B ("1") and cascade port 36C ("2") are the assigned active and backup cascade ports, respectively, for the extended port having EP_Index of "16". In this way, aggregation device 30 may forward the packet through cascade port 36B included in one of IFCs 55 and if cascade port 36B is temporarily unreachable, may forward the packet through cascade port 36C included in another one of IFCs 55.

FIG. 4B illustrates an example selector data structure 400 where cascade port 36B is permanently unreachable or unreachable for a specified period of time. Selector data structure 400 of FIG. 4B is similar to selector data structure 400 of FIG. 4A, except as described below.

In the event one or more cascade ports 36 are permanently unreachable or unreachable for a specified interval, aggregation device 30 may assign new active and backup cascade ports (referred to herein as "rebalancing"). In the example of FIG. 4B, cascade port 36B ("1") is permanently unreachable or unreachable for a specified interval. In this example, for association entries 404 within selector data structure 400 where cascade port 38B ("1") is assigned as an active cascade port, aggregation device 30 may assign new active and backup cascade ports.

For example, as previously illustrated in FIG. 4A, cascade port 36B is initially assigned as an active cascade port for selector indices "3" through "5". In some examples, aggregation device 30 may reassign the backup cascade ports associated with selector indices "3" through "5" as a new active cascade port, and assign another one of cascade ports 36 as a new backup cascade port. For example, for selector index "3", backup cascade port 36A is reassigned as a new active cascade port and cascade port 36D is assigned as a new backup cascade port. For selector index "4", backup cascade port 36C is reassigned as a new active cascade port and cascade port 36A is assigned as a new backup cascade port. For selector index "5", backup cascade port 36D is reassigned as a new active cascade port and cascade port 36C is assigned as a new backup cascade port. In some examples (not shown), aggregation device 30 may assign for indices "3" through "5" new active and backup cascade ports that were not previously assigned as either active or backup cascade ports.

In the example of FIG. 4B, for association entries 404 within selector data structure 400 where cascade port 38B ("1") is assigned as a backup cascade port, aggregation device 30 may assign a new backup cascade port. For example, as previously illustrated in FIG. 4A, cascade port 36B is initially assigned as a backup cascade port for selector indices "0", "7", and "10". For selector index "0", aggregation device 30 may assign cascade port 36C as a new backup cascade port. For selector index "7", aggregation device 30 may assign cascade port 36D as a new backup cascade port. For selector index "10", aggregation device 30 may assign cascade port 36A as a new backup cascade port.

The assignment of new active and backup cascade ports may be "rebalanced" in a way that the newly assigned active and backup cascade ports are evenly distributed across the index values. That is, when assigning new active and backup cascade ports, aggregation device 30 may configure an even distribution of the remaining reachable cascade ports as active cascade ports across the twelve indices, and an even distribution of the remaining reachable cascade ports as backup cascade ports across the twelve indices such that aggregation device may effectively load-balance traffic across the remaining reachable cascade ports.

Figure 5:
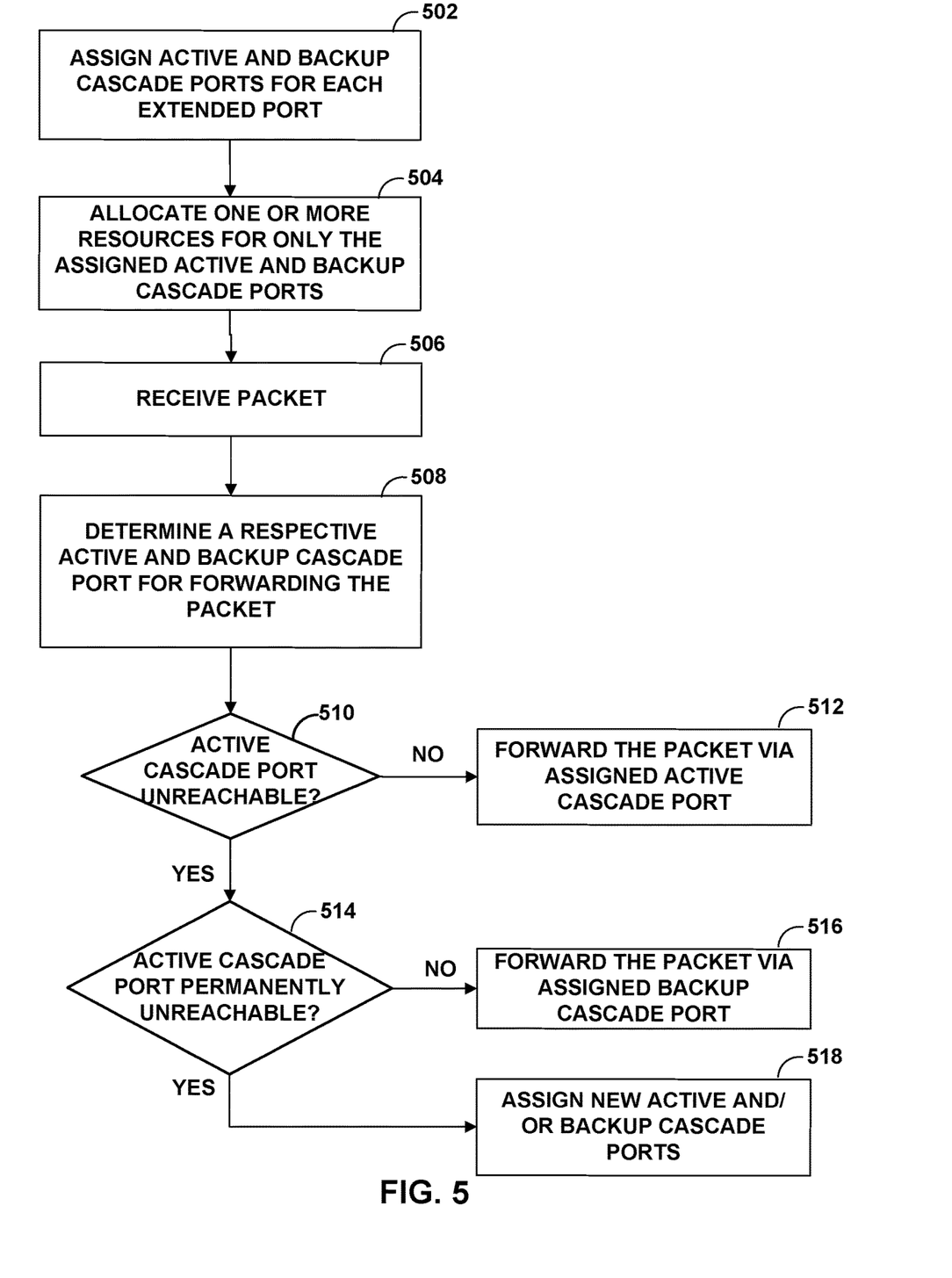
FIG. 5 is a flowchart illustrating an example operation of an aggregation device, in accordance with techniques described in this disclosure.

FIG. 5 is a flowchart illustrating an example operation of aggregation device, in accordance with techniques of this disclosure. The example operation is described herein with reference to aggregation device 50 of FIG. 3. In other examples, the operation may be performed by any of aggregation devices 30 within switch 18 of FIGS. 2A-2B.

Aggregation device 50 assigns active and backup cascade ports for each extended port of a satellite device interconnected to aggregation device 50 (502). For example, aggregation device 30 may include a port selector module 62 for configuring entries within selector data structure 76 that associate respective selector indices with corresponding active and backup cascade port pairs.

Aggregation device 50 allocates one or more resources for only the assigned active and backup cascade ports (504). For example, for each extended port, aggregation device 50 allocates resources provisioned on aggregation device 50 for use by the satellite device only for the assigned active and backup cascade ports.

Aggregation device 50 may receive a packet destined for a host connected to a satellite device (506). Aggregation device 50 may determine a respective active and/or backup cascade port pair assigned to a corresponding extended port for forwarding the packet (508). For example, aggregation device 50 may receive a packet and compute a next hop based on a lookup of cascade port list 72 and selector data structure 76. For example, forwarding engine 56 of aggregation device 50 may perform a lookup of cascade port list 72 to identify a list of cascade ports coupled to satellite device 32A. Forwarding engine 56 may perform a lookup of selector data structure 76 to identify the active or backup cascade port for forwarding the packet. For example, forwarding engine 56 may identify an extended port index (e.g., EP_Index) based on key fields of the packet. Forwarding engine 56 may compute a selector index based on the EP_Index and the number of active and backup cascade port combinations. Aggregation device 50 may use the selector index to identify the active cascade port for which to forward the packet.

Aggregation device 50 determines if the active cascade port is unreachable (510). In response to determining that the active cascade port is reachable ("NO" branch of 510), aggregation device 50 forwards the packet via the active cascade port determined from the lookup of selector data structure 76 (510).

In response to determining that the active cascade port is unreachable ("YES" branch of 510), aggregation device 30 determines if the active cascade port is permanently unreachable or unreachable for a specified time (514). If the active cascade port is temporarily unreachable, ("NO" branch of 514), aggregation device 50 forwards the packet via the backup cascade port determined from the lookup of selector data structure 76 (516).

In response to determining that the active cascade port is permanently unreachable or unreachable for a specified period of time ("YES" branch of 514), aggregation device 50 may assign new active and backup cascade ports for selector data structure 76 (516). For example, if an active cascade port is unreachable for a specified duration of time, port selector module 62 of aggregation device 50 may assign new active and backup cascade ports within selector data structure 76 where the unreachable cascade port is assigned as an active cascade port. In some examples, port selector module 62 may reassign the backup cascade ports associated with the unreachable cascade port as a new active cascade port, and assign another cascade port as a new backup cascade port. In other examples, port selector module 62 may assign new active and backup cascade ports that were not previously assigned.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other medium that can be used to store desired program code in the form of instructions or data structures and that can be accessed by a computer. The term "computer-readable storage media" refers to non-transitory, tangible storage media, and not connections, carrier waves, signals, or other transitory media.

Various examples have been described. These and other examples are within the scope of the following claims.

What is claimed is:

1. A method comprising:
    assigning, by an aggregation device having a plurality of cascade ports coupled to a satellite device, an active cascade port and a backup cascade port from the plurality of cascade ports of the aggregation device for each extended port of a plurality of extended ports of the satellite device, wherein the plurality of extended ports of the satellite device connect to a plurality of host devices; and
    allocating, by the aggregation device, one or more resources of the aggregation device only for the active cascade port and the backup cascade port assigned to a given extended port of the plurality of extended ports of the satellite device for use of the allocated one or more resources by the given extended port;
    receiving, by the aggregation device, a packet destined for a host device of the plurality of host devices coupled to the satellite device by the given extended port of the plurality of extended ports;
    determining, by the aggregation device, the active cascade port assigned to the given extended port by performing a lookup of a selector index in a selector data structure comprising the assigned active cascade port and the assigned backup cascade port for each extended port of the plurality of extended ports, wherein the selector index is associated with the active cascade port and the backup cascade port assigned to the given extended port; and
    forwarding, by the aggregation device and to the satellite device, the packet through the active cascade port.

2. The method of claim 1, wherein the selector index is computed based on an index of the plurality of extended ports and a number of active cascade port and backup cascade port combinations of the plurality of cascade ports.

3. The method of claim 1, wherein the packet comprises a first packet, further comprising:
    receiving, by the aggregation device, a second packet destined for a host device of the plurality of host devices coupled to the satellite device by the given extended port of the plurality of extended ports;
    determining, by the aggregation device, that the active cascade port assigned to the given extended port is temporarily unreachable; and
    forwarding, by the aggregation device and to the satellite device, the second packet through the backup cascade port assigned to the given extended port.

4. The method of claim 1, wherein the packet comprises a first packet, further comprising:
    receiving, by the aggregation device, a second packet destined for the host device of the plurality of host devices coupled to the satellite device by the given extended port of the plurality of extended ports;
    determining, by the aggregation device, that the active cascade port assigned to the given extended port is unreachable for a specified period of time; and
    assigning, by the aggregation device, a new active cascade port and a new backup cascade port from the plurality of cascade ports for the given extended port.

5. The method of claim 4, wherein assigning the new active cascade port for the extended port comprises:
    assigning the backup cascade port assigned to the given extended port as the new active cascade port for the given extended port.

6. An aggregation device comprising:
    a memory; and
    one or more processors in communication with the memory configured to:
        assign an active cascade port and a backup cascade port from a plurality of cascade ports of the aggregation device for each extended port of a plurality of extended ports of a satellite device, wherein the plurality of cascade ports is coupled to the satellite device, and wherein the plurality of extended ports connects to a plurality of host devices; and
        allocate one or more resources of the aggregation device only for the active cascade port and the backup cascade port assigned to a given extended port of the plurality of extended ports of the satellite device for use of the allocated one or more resources by the given extended port;
        receive a packet destined for a host device of the plurality of host devices coupled to the satellite device by the given extended port of the plurality of extended ports;
        determine the active cascade port assigned to the given extended port by performing a lookup of a selector index in a selector data structure comprising the assigned active cascade port and the assigned backup cascade port for each extended port of the plurality of extended ports, wherein the selector index is associated with the active cascade port and the backup cascade port assigned to the given extended port; and
        forward the packet through the active cascade port to the satellite device.

7. The aggregation device of claim 6, wherein the selector index is computed based on an index of the plurality of extended ports and a number of active cascade port and backup cascade port combinations of the plurality of cascade ports.

8. The aggregation device of claim 6, wherein the packet comprises a first packet, wherein the memory and one or more processors in communication with the memory is further configured to:
    receive a second packet destined for the host device of the plurality of host devices coupled to the satellite device by the given extended port of the plurality of extended ports;
    determine that the active cascade port assigned to the given extended port is temporarily unreachable; and
    forward the second packet through the backup cascade port assigned to the given extended port to the satellite device.

9. The aggregation device of claim 6, wherein the packet comprises a first packet, wherein the memory and one or more processors in communication with the memory is further configured to:
    receive a second packet destined for the host device of the plurality of host devices coupled to the satellite device by the given extended port of the plurality of extended ports;

determine that the active cascade port assigned to the given extended port is unreachable for a specified period of time; and assign a new active cascade port and a new backup cascade port from the plurality of cascade ports for the given extended port.

10. The aggregation device of claim 9, wherein, to assign the new active cascade port for the given extended port, the memory and one or more processors in communication with the memory is further configured to:

assign the backup cascade port assigned to the given extended port as the new active cascade port for the extended port.

11. A non-transitory computer-readable storage medium storing instructions that when executed cause one or more programmable processors of an aggregation device to:

assign an active cascade port and a backup cascade port from a plurality of cascade ports of the aggregation device for each extended port of a plurality of extended ports of the satellite device, wherein the plurality of cascade ports is coupled to the satellite device, and wherein the plurality of extended ports connect to a plurality of host devices; and allocate one or more resources of the aggregation device only for the active cascade port and the backup cascade port assigned to a given extended port of the plurality of extended ports of the satellite device for use of the allocated one or more resources by the given extended port;

receive a packet destined for a host device of the plurality of host devices coupled to the satellite device by the given extended port of the plurality of extended ports;

determine the active cascade port assigned to the given extended port by performing a lookup of a selector index in a selector data structure comprising the assigned active cascade port and the assigned backup cascade port for each extended port of the plurality of extended ports, wherein the selector index is associated with the active cascade port and the backup cascade port assigned to the given extended port; and forward the packet through the active cascade port to the satellite device.

12. The non-transitory computer-readable storage medium of claim 11, wherein the packet comprises a first packet, wherein the instructions further comprise instructions that cause the one or more programmable processors of an aggregation device to:

receive a second packet destined for the host device of the plurality of host devices coupled to the satellite device by the given extended port of the plurality of extended ports;

determine that the active cascade port assigned to the given extended port is temporarily unreachable; and forward the second packet through the backup cascade port assigned to the given extended port to the satellite device.

13. The non-transitory computer-readable storage medium of claim 11, wherein the packet comprises a first packet, wherein the instructions further comprise instructions that cause the one or more programmable processors of an aggregation device to:

receive a second packet destined for the host device of the plurality of host devices coupled to the satellite device by the given extended port of the plurality of extended ports:

determine that the active cascade port assigned the given extended port is unreachable for a specified period of time; and assign a new active cascade port and a new backup cascade port from the plurality of cascade ports for the given extended port.

14. The non-transitory computer-readable storage medium of claim 11, wherein the selector index is computed based on an index of the plurality of extended ports and a number of active cascade port and backup cascade port combinations of the plurality of cascade ports.

* * * * *